Jan. 7, 1969 R. W. HANSON 3,419,960
PARACHUTE LINE CUTTING DEVICE
Filed Jan. 16, 1967
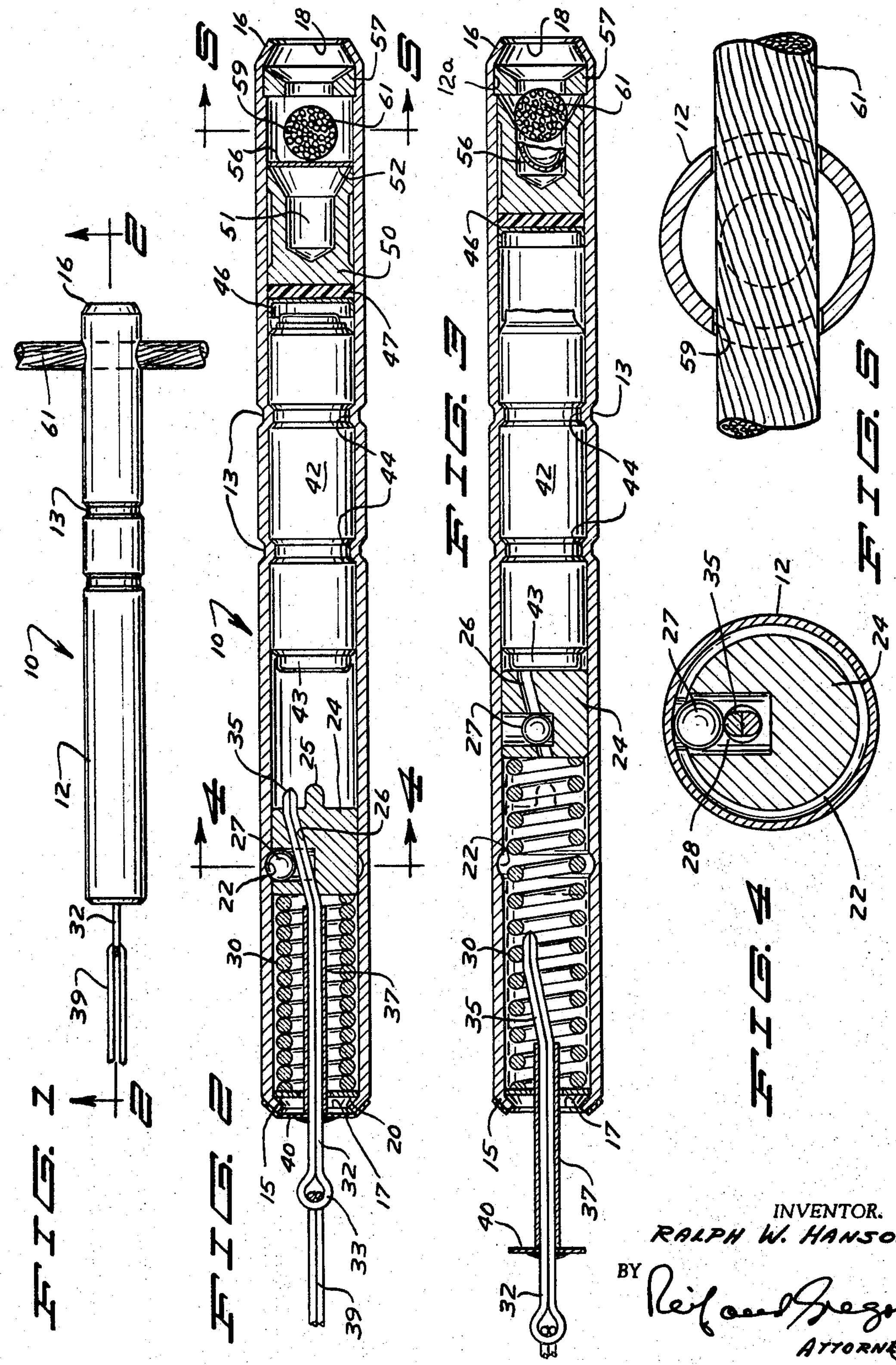
INVENTOR.
RALPH W. HANSON
BY
Reifsnider & Gregory
ATTORNEYS United States Patent Office 3,419,960

Patented Jan. 7, 1969

1

3,419,960

PARACHUTE LINE CUTTING DEVICE

Ralph W. Hanson, Minneapolis, Minn., assignor to Technical Ordnance, Inc., Minneapolis, Minn., a corporation of Minnesota Filed Jan. 16, 1967, Ser. No. 609,448
U.S. Cl. 30—180 2 Claims
Int. Cl. B64d *17/72*; B26b *17/00*

ABSTRACT OF THE DISCLOSURE

A parachute line cutting device having solder sealed closure members and a sealed ball releasing mechanism. The device has a tubular housing with a release pin extending from the rear end and a cylindrical shape cutter in the forward end. Between these elements are a spring powered firing pin and an explosive cartridge. A breakable solder sealed cap surrounds the pin and closes the rear end of the housing. A breakable solder sealed disc is adjacent the cutter and encloses the cutter in the housing. Thus all the working parts of the device are sealed in the housing between the end cap and the disc seal.

*Background of invention*

The direct classifications are in Aeronautics, Class 244, Sub-classes 149 and 150, and Ordnance, Class 89 and Subclass 1.

Known reference material in the prior art consists of the following U.S. patents: Sutor—3,087,385, Stupian—2,897,799, Hight — 2,616,748, Thormess — 2,926,565, Frieder et al.—2,581,645, Moran—2,780,428, and Benjamin—2,755,550.

The structure disclosed and claimed herein is distinguishable from the reference material known in having solder sealed closures and in having a simplified triggering mechanism directly connected with the body of the firing pin and the releasing mechanism.

*Summary*

It is an object of this invention to provide a hermetically sealed parachute line cutting device of simple and efficient structure.

It is another object of this invention to provide a parachute line cutting device having a breakable solder sealed end cap having a releasing means extending therethrough and integral therewith and being angularly disposed through the body portion of a firing pin and having an internally contained ball check or releasing mechanism in connection therewith.

It is also an object of this invention to provide a solder sealed closure disc to overlie the cutting means of said device.

These and other objects and advantages of the invention will be set forth in the following description made in connection with the accompanying drawings in which like reference characters refer to similar parts throughout the several views and in which:

FIG. 1 is a view in elevation;

FIG. 2 is a view on an enlarged scale in section taken on line 2—2 of FIG. 1 as indicated;

FIG. 3 is a view similar to FIG. 2 showing the device in operated condition;

FIG. 4 is a view in cross section on an enlarged scale taken on line 4—4 of FIG. 2 as indicated; and FIG. 5 is a view in cross section on an enlarged scale taken on line 5—5 of FIG. 2 as indicated.

*Description of a preferred embodiment*

The device herein is indicated generally by the numeral 10 and comprises an elongated substantially cylindrically

2 tubular housing or casing 12. Said casing at either end thereof has annular inclined end walls 15 and 16 respectively having apertures 17 and 18 therethrough. Said wall 15 is designated as being at the rearward end of said casing and the wall 16 is designated as being at the forward end of said casing.

Disposed within said housing and bearing against said wall 15 is a washer 20.

Spaced inwardly of said wall 15 is an internal recess or groove 22 which is indicated here as being annular. A cylindrical hammer 24 is within said casing having a forwardly projecting firing pin 25. Extending within said hammer is a cavity 28 arranged for positioning into radial alignment with said groove 22. Adapted to be contained within said cavity 28 and movable to be partially disposed into said groove 22 is a ball 27.

A passage 26 extends through said hammer being angled upwardly longitudinally therethrough to intersect the lower portion of the cavity 28.

Carried in said casing confined between said hammer 24 and said washer 20 is a coiled spring 30. Extending inwardly axially of said casing 12 through said aperture 17 is a release pin 32 shown here in a form on the order of an elongated cotter key having an eyelet head portion 33 and an angled forward end portion 35 adapted to be disposed through said passage 26. Carried on the straight portion of said pin 32 within said casing 12 is a sleeve 37 preferably formed of a self lubricating type of material such as Teflon. Said sleeve is shown extending through said washer 20.

Carried in said eyelet 33 is a pull ring 39. Sealing the aperture 17 is a disc-like end cap 40 forming an end closure and apertured to have said pin 32 disposed therethrough. Said end cap is solder sealed about its periphery to said shoulder 15 and solder sealed centrally to said pin 32. Responsive to a sharp pull, the solder seal will break about the periphery of the disc or about the pin in accordance with the relative strength with which the seals are made.

Positioned somewhat forwardly within said casing 12 and spaced axially from said firing pin 25 is a conventional type of cartridge 42 having an exposed primer 43. The transverse grooves 13 within the casing and the corresponding mating grooves 44 about the cartridge are formed in a conventional manner to secure said cartridge in position.

Spaced just forwardly of said cartridge and press fit within said casing 12 is a cup-shaped cap member 46 which serves as a gas check member. Abutting the forward face of said gas check member 46 and fitting snugly within said casing is a disc-shaped heat seal or heat barrier member 47 suitably formed of a suitable insulating material.

Positioned forwardly of said heat seal member 47 is a cylindrical cutting member 50 having a forwardly facing bore or core 51 therein for relief and terminating in a beveled circular blade or cutter 52. Protecting said blade and sealing the same from the atmosphere is a relatively thin formed as a disc 56 which will be soldered to the inner surface of the casing to form a solder sealed closure. Said disc 56 will be formed of a suitable thin material so readily fragmented by said cutter blade as not to interfere with the cutting action of the blade. Spaced from said cutter 50 is an apertured disc-like anvil 57 shown having a flat rear wall and a beveled forward wall and will be press fit into position. Said casing may be counterbored as at **12*a* to receive and position said anvil and said anvil will be retained by said inclined shoulder 16**.

Said casing 12 will have a pair of opposed apertures 59, and disposed therethrough is a parachute line 61.

*Operation*

With reference to FIG. 2, the device herein is shown in operating position. The closure members 40 and 56 hermetically seal the casing 12 with the exception of the anvil portion 57. The cartridge and all of the moving parts between said closure members are positively sealed from the atmospheric elements.

The inner end portion of the pin 32 is angled and is disposed through an angled or inclined passage through the hammer 24 to require a sufficient degree of pull on ring 39 to prevent an inadvertent withdrawal of said pin 32. A strong sharp pull on the ring 29 will withdraw the pin from the hammer 24. As shown in FIG. 2, the angled portion of the pin 32 raises the ball 27 to have it partially seated within the recess 22. The ball supported in this position forms a check to hold the hammer in position against the compression of the coiled spring 30. Said spring is retained between said hammer and the washer 20. As the pin is pulled away from the hammer, the ball 27 drops to be fully received within the cavity 28 and thus releases the hammer 24.

With reference to FIG. 3, said hammer upon being released is propelled forwardly by action of the spring 30 whereupon the firing pin 25 strikes the primer 43 to fire the cartridge 42. The press fit gas check cap 46 effectively confines the gases to within the casing for a maximum propulsion of the cutter 50. The disc 56 which serves as an effective seal will be formed to be readily fragmented by the blade 52 and does not interfere with the cutting action of the blade in severing the line 61 against the adjacent face of the anvil 57.

The end closure disc 40 is soldered about its periphery to the shoulder 15 and is soldered centrally to the pin 32. The solder may be applied to have the seal break either at the periphery of the disc or about the pin. With reference to FIG. 3, the disc or closure 40 is pulled away at its periphery and is carried outward by the pin 32. The Teflon sleeve 37 about the straight portion of the pin within the casing extends through the washer 20. The sleeve in being formed of material on the order of Teflon will have a non-sticking surface so that it will slide easily through the aperture of the washer 20 without catching onto any rough edges which might be present about the edges thereof. With a metal to metal contact as between the pin directly with the washer, there is a likelihood of the pin being snagged by a rough edge of the washer. The sleeve avoids such a happening and assures a smooth and ready withdrawal of the pin. If desired, said sleeve may be secured to said washer and said pin 32 may be withdrawn therethrough. In this event or if the seal breaks about the pin, the sleeve will remain within the housing and will become deformed to accommodate the withdrawal of the pin.

It will be noted that the ball 27 is completely sealed within the casing and free from contamination by the atmosphere whereby it will be in a ready acting position to drop freely into the cavity 28 upon the withdrawal of the pin 32 therefrom.

Thus it is seen that I have provided a simply constructed and efficiently operating parachute line cutting device which has been very successful in operation.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claims.

What is claimed is:

1. A parachute line cutting device comprising
an elongated cylindrical casing,
a hammer slidable within said casing, a firing pin projecting from said hammer,
means releasably securing said hammer to said casing,
a coiled spring disposed between said hammer and one end of said casing,
an elongated releasing pin having a portion extending axially into said casing through one end thereof and through said spring and having an inner end portion disposed at an angle through said hammer, said pin actuating said means to secure said hammer,
an end closure member secured to said pin and breakably solder sealed to said end of said casing,
an explosive cartridge secured within said casing,
a cylindrical cutting member adapted to be propelled by said cartridge,
an anvil spaced from said cartridge and secured within said casing,
means comprising a gas check member adjacent said cartridge sealing within said casing the end thereof adjacent said anvil,
a closure member overlying the outer end of said cutting member and being solder sealed to said casing, and
a parachute line disposed through said casing between said last mentioned member and said anvil.

2. The structure set forth in claim 1, wherein
said casing has an internal groove spaced inwardly of one end thereof,
said hammer has an open topped cavity extending downwardly therein, said cavity being adapted to be radially aligned with said groove,
a ball is fully receivable within said cavity and partially receivable within said groove,
a passage is angled longitudinally through said hammer and intersects said cavity, and
said pin has a portion disposed through said passage which engages said ball and positions it to be partially disposed within said cavity and partially disposed within said groove.

References Cited

UNITED STATES PATENTS 2,140,214 12/1938 Temple ------------- 83—452

ROBERT C. RIORDON, *Primary Examiner*.

J. C. PETERS, *Assistant Examiner*.

U.S. Cl. X.R.

244—149